(No Model.)
3 Sheets—Sheet 1.
J. W. CLARK & N. A. PALMER.
AUTOMATIC CHECK ROW CORN PLANTER.
No. 314,431. Patented Mar. 24, 1885.
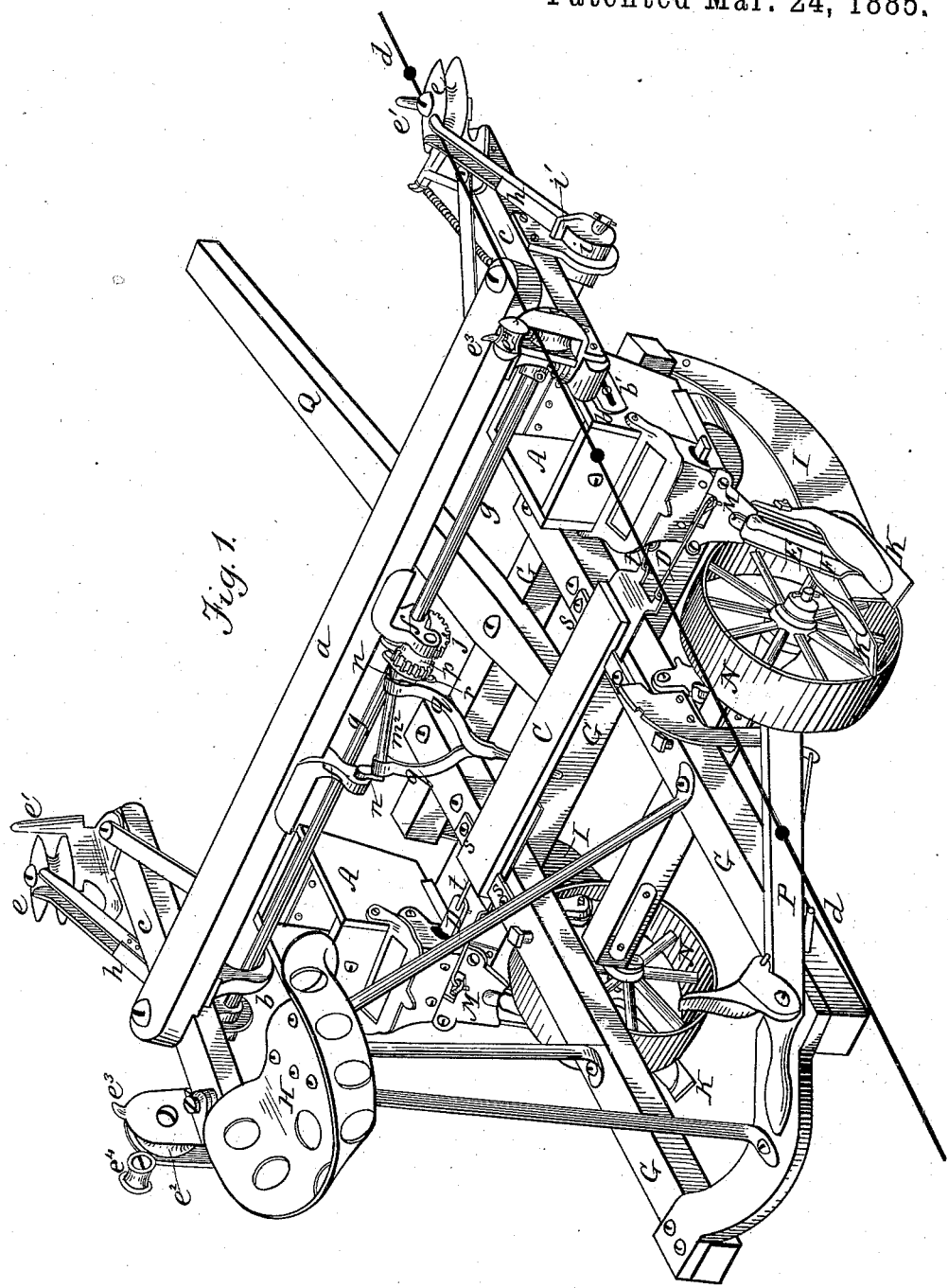

(No Model.) 3 Sheets—Sheet 2.
J. W. CLARK & N. A. PALMER
AUTOMATIC CHECK ROW CORN PLANTER.
No. 314,431. Patented Mar. 24, 1885.
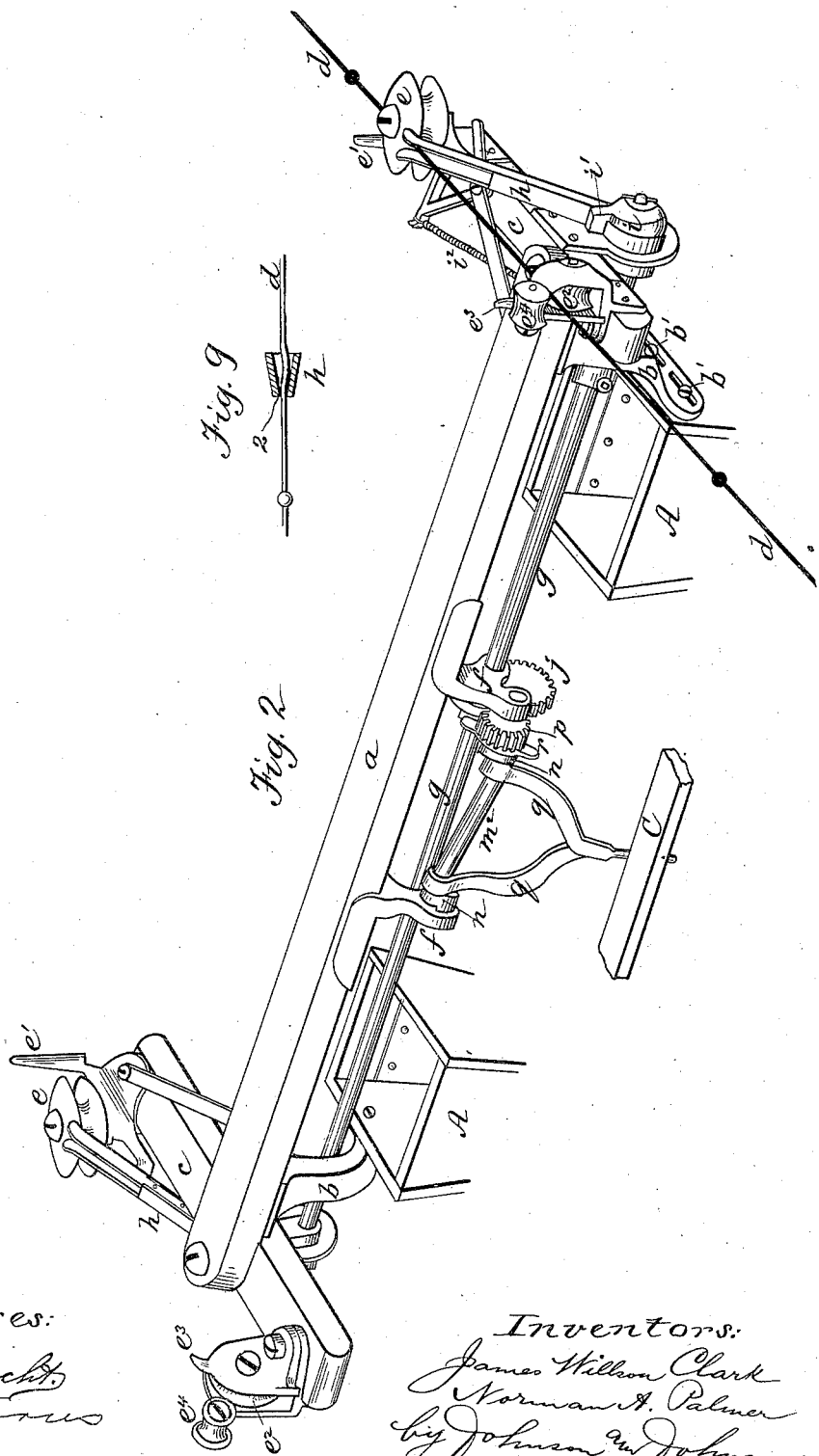

(No Model.) 3 Sheets—Sheet 3.
J. W. CLARK & N. A. PALMER
AUTOMATIC CHECK ROW CORN PLANTER.
No. 314,431. Patented Mar. 24, 1885.
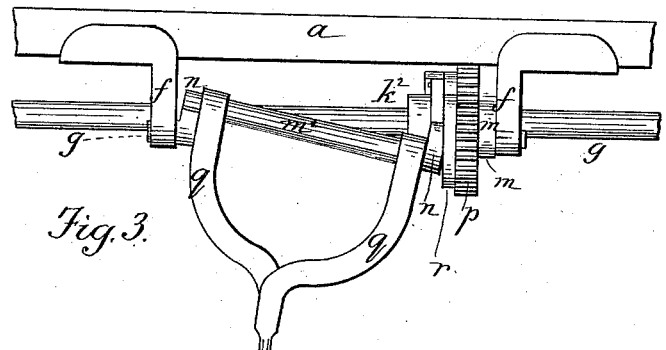
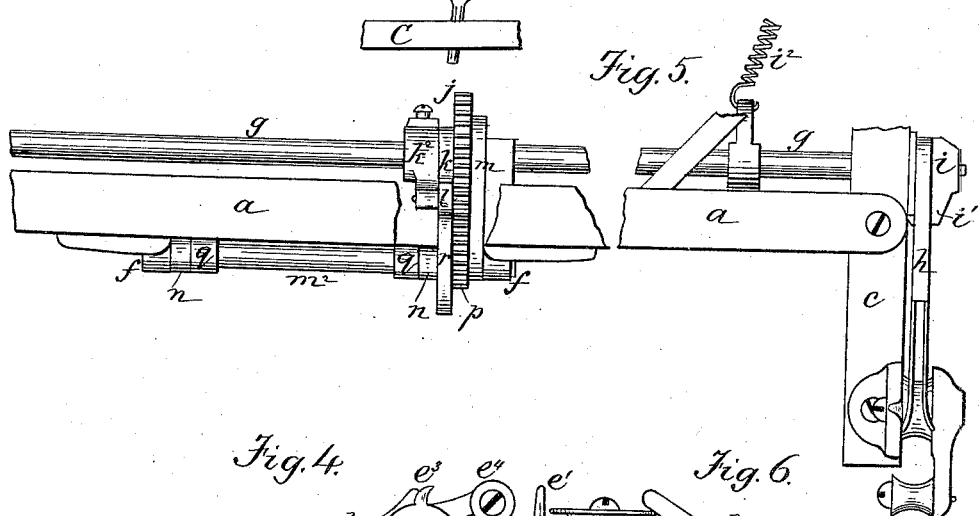
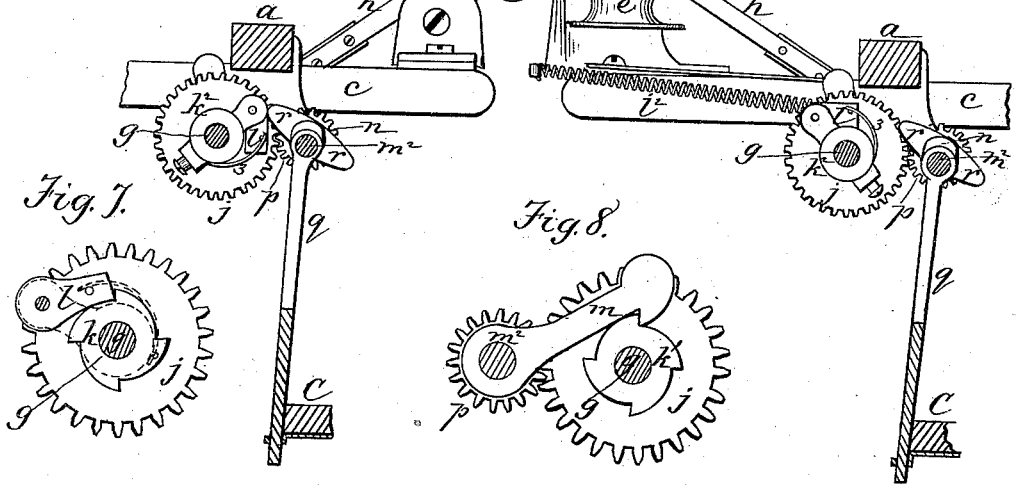
Witnesses:
Inventors:
James Wilson Clark
Norman A. Palmer
by Johnson and Johnson
Attys.
N. PETERS. Photo-Lithographer, Washington, D.C.

UNITED STATES PATENT OFFICE.

JAMES WILSON CLARK AND NORMAN A. PALMER, OF PATASKALA, OHIO.

AUTOMATIC CHECK-ROW CORN-PLANTER.

SPECIFICATION forming part of Letters Patent No. 314,431, dated March 24, 1885.

Application filed October 11, 1884. (No model.)

*To all whom it may concern:*

Be it known that we, JAMES WILSON CLARK and NORMAN A. PALMER, citizens of the United States, residing at Pataskala, in the county of Licking and State of Ohio, have invented new and useful Improvements in Automatic Check-Row Corn-Planters, of which the following is a specification.

Our invention relates to improvements in that kind of check-rower planters in which a tappet-wire stretched across the field constitutes the means for automatically actuating a forked lever at regular intervals for transmitting motion to the dropping devices as the planter traverses the field back and forth over said tappet-wire. Mechanism by which to control the actuating throw of the wire-operated lever, and thereby control the throw of the corn-dropping device, mechanism for giving a quick and certain action to the corn-dropping device, and mechanism for preventing the accidental movement of the corn-dropping device between the actions of the line-operated levers, together with co-operating or auxiliary mechanism constituting elements of a check-rower device embracing a double-crank shaft for operating the corn-dropping slide with a quick and perfectly controlled movement, will hereinafter be described preparatory to a specific designation of the organization of devices and combinations of parts claimed as our invention, and illustrated in the accompanying drawings, in which—

Figure 1 represents in perspective a corn-planting machine having our improved check-rower attachment applied thereto; Fig. 2, a similar view of the check-rower attachment or device detached from the machine; Fig. 3, a rear side view of the corn-dropping slide-actuating device, of which the double-crank shaft is the essential element, and is shown in position in which its double cranks act to lock the slide-bar of the seed-dropping device between each action of the dropping-slides; Fig. 4, a cross-section of the same, particularly showing the action of the stop-arm of the double-crank shaft to control and limit the acting throw of the actuating-lever and of the corn-dropping slides; Fig. 5, a top view of the same, showing also the position of the actuating-lever at the limit of its full throw by the field-line; Fig. 6, a similar view to Fig. 4, showing the same parts in the positions they occupy between the actions of the dropping devices; and Figs. 7 and 8 show the ratchet-pawls.

The check-row attachment is mounted upon the hoppers A A, and the several operating devices thereof are carried by a beam, $a$, arranged horizontally above the hoppers, to the outer ends of which said bar is connected by brackets $b\,b$, slotted to receive fastening-bolts $b'\,b'$, by which the attachment is set true. At each end the bar $a$ carries cross-arms $c\,c$, which are provided with the usual guides for sustaining and connecting the field check-row line $d$ in position for operating the corn-dropping mechanism. These guides consist of the horizontal pulley $e$ and finger $e'$ at the front end of the arm $c$, and a vertical pulley, $e^2$, finger $e^3$, and guide-roller $e^4$ at the rear end of said arm, and over these the check-row line is confined to the machine as it traverses the field. Mounted in hangers $f$ of these cross-arms $c$, and of the bar $a$, is the usual oscillating shaft, $g$, which extends across the machine beneath the bar $a$, and carries loosely mounted at each end outside the arms $c$ the forked levers $h\,h$, which are operated by the knots or tappets of the field-line at intervals determined by the distance between the line-knots to turn the shaft, as stated. The oscillation of the shaft $g$ is effected by a hub, $i$, fixed upon the end of the shaft, having a lug or arm, $i'$, crossing the lever, so that when the knotted line engages the lever and carries it forward it engages with the lug $i'$, and carrying back turns the shaft. The lever having thus been carried over to the rear guide-pulley, $e^2$, the knot of the line is released from its forked end, and the shaft being retracted by a spring, $i^2$, the lug $i'$ also carries the forked lever forward to its position of rest, just in rear of the front guide-pulley, $e$, with the field-line between its forks, ready to receive the action of the next knot or tappet as the machine moves forward. The fork of the lever has the usual flaring end to receive the line in its retracting movement; but instead of having the opening between the forks of equal width at the front and rear sides of the lever, we make it of V shape in cross-section, with the narrow open side standing to the front, as shown in Fig. 9, and serving to prevent kinks in the wire from passing into and binding between the forks, as the edges of the forks tend to turn the kinks to one side in the space between the forks. Both the forked levers being mounted loosely upon the shaft, only one lever operates at a time with the field-line, in a manner well understood in operating check-row corn-planters.

The transmission of the intermittent movement of the lever by the knotted line to the corn-dropping slide D is effected by intermediate devices, which we will describe. A spur-gear, $j$, is loosely mounted upon the operating-shaft $g$, and has a ratchet-hub, $k\,k'$, on each side, being held in place between the hanger $f$ and collar $k^2$, fixed on the shaft. This shaft-collar has an arm which carries a pawl, $l$, Fig. 7, held in engagement with the ratchet-hub $k$ by a spring, 3, whereby the loosely-mounted gear $j$ is operated with the turning of the shaft by the line-connecting lever. A pawl, $m$, pivoted on the bearing end of the crank-shaft, engages the ratchet-hub $k'$ of the gear, so as to prevent back motion of the latter. A shaft, $m^2$, is mounted in hangers $f$ of the bar $a$, and has a crank, $n$, standing in opposite directions at each end between the hangers, while a pinion, $p$, on one end of the shaft $m^2$ outside of the crank engages with the gear $j$ to operate this double-crank shaft.

Upon the shaft $m^2$, between its cranks, is mounted a forked arm, $q$, having its lower end suitably connected with the slide-bar C, which operates the corn-droppers. This shaft $m^2$ carries a double-ended stop-arm, $r$, between the pinion $p$ and the crank $n$, so that each rocking movement of the shaft $g$ will bring one end of the said stop-arm $r$ direct against the pivoted end of the ratchet-pawl $k$, as in Figs. 4 and 5, both meeting at a point above and between the shafts $g\,m^2$, as in Fig. 4, and thus form a stop to limit the rearward throw of the line-operated lever, and consequently the oscillation of the lever-shaft $g$. It is important that this stop $r$ should act at the moment the dropping-slide D has moved its full stroke in either direction, and in Fig. 3 it will appear that the double-ended stop $r$ acts when the cranks of the shaft are standing vertical— that is, one crank up and the other down at each half-turn of the shaft—and in its movement and the rearward throw of the operated lever both are limited by the stop-arm to control the movement of the corn-dropping slide. The bearings of the double-crank shaft are in the same axial line outside of the cranks, while that portion between the cranks upon which the forked arm $g$ is mounted is changing its position intermittently as it revolves to vibrate said arm at regular intervals. The provision for revolving the shaft $m^2$ on coincident bearings outside of the cranks reduces the friction of the crank-shaft, and the provision of a double crank gives the shaft its intermittent action for operating the corn-dropping slide, and such provision is due to the arrangement of the cranks between the journal-bearings, so that both cranks co-operate to vibrate the forked arm at intervals controlled by the line-levers, to equalize the friction at each end of the shaft, to prevent any lost motion of the arm upon the shaft, and to relieve the pinion from the motion of the cranked part of the shaft. These advantages and the advantages of an intermittent rotation of the crank-shaft could not be obtained with a single crank connecting the vibrating arm. The shaft $m^2$ being mounted in bearings having the same axis, and the cranks $n$ arranged, as described, between the bearings, and the forked arm $g$ hung upon the shaft between the cranks, and the crank-shaft having an intermittent rotation, that portion of the shaft between the cranks will have a movement controlled by the cranks, so that at every half-revolution of the shaft the cranks will move to and stand in opposite vertical positions, and thus vibrate the arm $q$ with a quick motion, both cranks co-operating to effect this action in throwing the arm, so that one revolution of the crank-shaft gives a back-and-forth movement of the arm, and a corresponding movement to the slide-bar C of the corn-dropping devices.

The check-row attachment organized as described can be removed from the machine and the corn-dropping slide D operated by hand-lever in the usual manner, and the attachment can be applied to any corn-planter suitable for automatic check-row planting in double rows.

In the operation of this double crank device the check-row-lever shaft $g$ is caused to turn back and forth through about a quarter of a revolution, while the double-crank shaft $m^2$ must revolve, but not continuously, only making a half-revolution at each turn against a positive stop, $r$, brought into action at the same time the forked lever passes the tappet or knot of the field-line, and thus prevent the double-crank shaft from turning too far, which would tend to disarrange the regular dropping action of the slide D; but the intermittently-revolving stop $r$ co-operates with the fixed field-line to arrest the movement of the dropping-slide at the same time the tappets of the line have completed the throw of the lever, and the latter is released from the tappet to resume its position to receive the action of the next tappet. The slide-bar C, which connects with and is operated by the forked arm $q$, hung upon the double-crank shaft $m^2$, is fitted in guides $s\,s$ upon the frame-beams, and is connected at each end by a link, $t$, to the corn-dropping slide D proper. The slide-bar C is also connected with and operates a flapper-valve, E, pivoted in the conductor F, which receives the corn from a side chamber of the hopper and retains and delivers it into the ground at the proper moment at each side of the machine.

The check-row attachment is illustrated in connection with a complete machine, in which the corn-dropping slide D is arranged to pass through the hopper, and by means of cells receive and deliver the corn; or the slide may be used to operate a rotary or other device for effecting the delivery of the corn, and a particular description of the machine shown is deemed unnecessary, since, as stated, our improved check-rower mechanism can be applied to any machine suited for automatic check-row planting.

The corn-containing hoppers A A are secured to a suitable frame, G, upon which the driver's seat H is mounted.

I I are the runners or furrow-openers attached to the corn-conductors F F, having covering-wings K K, and provided with what is known as "flapper" or "side-turning" valves E E, stepped in the lower part of the conductor F, and operating so as to form a chute with each edge of the conductor and retain the corn at the lower end in position to be dropped into the furrow at the open heel of the runner, in a manner well understood. The flapper-valve has a crank-arm, M, by which it is connected to the slide-bar C, which operates the corn-dropping slide.

The machine is provided with truck-wheels N, by which it is raised to carry the runners off the ground in going to and from the field, and in turning the machine at the ends of the field, said truck-wheels being operated by a lever, P, and fastening device connected therewith, under the control of the driver.

Q represents the tongue of the machine; and it will be understood that the runners are secured to the frame and to the corn-conductors.

The operation of the knotted fixed field-line upon the check-row machine being well understood, it is deemed unnecessary to specifically describe such operation, further than to state that the field-wire being properly adjusted in its guides and the machine driven forward along by the wire, its knots, which are placed a distance apart equal to the hills of corn, operate the forked lever $q$ at intervals controlled by said knots, and thus actuate the corn-dropping slide through the intermediate mechanism, as stated, the double cranks $n$ throwing the slide-bar C and locking it between the actions by the position of the cranks, one standing up and the other standing down in a plane with forked arm, so that the latter cannot move until it is properly moved by the operation of the check-line. The connection of the crank-shaft arm $q$ with the slide-bar C may be made adjustable to give the exact movement of the dropping-slide and flapper-valve.

The capacity for adjusting the check-rower attachment upon the machine is important to obtain a true and easy working of the devices of which it is composed, and of the slide-bar of the corn-dropping devices. For this purpose the attaching-brackets $b$ are provided with horizontal slots, and each bracket is secured by two screw-bolts, $b'$, so that the brackets can be adjusted on each hopper to perfectly line the attachment to obtain the easy and true working of the parts.

The slots in the brackets $b$ of the check-row attachment admit of adjustment to suit a slow or fast walking team to drop the corn in line in the cross-rows.

We claim—

1. A check-rower device composed, essentially, of a slide-operating shaft, $m^2$, having a crank, $n$, at each end, arranged in opposite relation to each other between its bearing ends, in combination with a stop-arm, $r$, carried by said crank-shaft, and suitable gear and ratchet mechanism connecting said crank-shaft with the oscillating shaft $g$, whereby said crank-shaft is intermittently rotated, substantially as herein set forth.

2. In a check-rower device, the combination, with the double-crank shaft $m^2$, its arm $q$, and slide-bar C, operating the corn-dropping device, of a double arm, $r$, upon the crank-shaft, the intermittent oscillating shaft $g$, and mechanism arranged thereon to engage with and rotate said crank-shaft and co-operate with the arm $r$ thereon to effect such rotation intermittently in semi-revolutions, whereby to control the intermittent delivery of the corn from the hopper.

3. In an automatic check-rowing mechanism, the combination, with the fixed field-operating line and check-rowing levers, of a double-crank shaft, $m^2$, and a forked arm carried thereby, locked in position by the relation of the cranks to each other and to the said forked arm between the actions of the line-operated levers and the corn-dropping device, substantially as described, for the purpose specified.

4. In a check-rower device, the combination, with oscillating shaft $g$, the gear loosely fitted thereon, having ratchet-hubs $k\ k$ on each side, and the ratchet-pawl $l$, of the double-crank shaft $m^2$, having the pinion $p$, the ratchet-pawl $m$, the double-armed stop $r$, and the slide-connecting arm $q$, substantially as herein set forth, for the purpose stated.

5. The combination of the slide-bar, its connecting-arm $q$, the double-crank shaft $m^2$, rotated at intervals in semi-revolutions by means of the oscillating shaft $g$, and intermediate engaging mechanism, substantially as described, for the purpose specified.

6. In a check-rower device, the combination, with the loosely-swinging line-connecting levers, of a double-crank shaft, $m^2$, operated and controlled in intermittent semi-revolutions by a stop, $r$, thereon, operated and controlled by mechanism carried by the oscillating shaft $g$ of said line-connecting levers, substantially as described, for the purpose specified.

7. The combination, with the corn-containing hoppers and the dropping devices, of automatic check-rower mechanism connected with and intermittently operating the dropping-slides by an intermediate double-crank shaft, $m^2$, and a stop-arm, $r$, carried thereby, substantially as herein described, for the purpose specified.

8. In a check-rower device, the swinging lever $h$, having the field-line-retaining forks constructed of V shape in cross-section, with a narrow opening at the front and a wide opening at the rear side, in combination with the knotted field-line, substantially as described, for the purpose specified.

9. In an automatic check-rowing mechanism, the combination, with an operating field-wire and check-rowing devices, of a corn-dropping slide, D, and a flapper-valve, L, connected with and operated by a double-crank shaft, $m^2$, controlled in semi-intermittent revolutions and constituting an element of said check-rowing devices, substantially as herein set forth.

10. The combination, with the slide-bar of the corn-dropping devices and automatic check-row-operating mechanism, of a device connecting said slide-bar D with said mechanism, consisting of a double-crank shaft, $m^2$, having its bearings in the same axial line, its cranks $n$ at each end between the bearings and standing in opposite directions, and the arm $q$, hung upon said shaft between its cranks, the said crank-shaft being operated intermittently to operate the slide-bar, substantially as herein set forth.

11. A check-rower attachment for corn-planters, composed of a beam, $a$, provided with attaching-brackets $b$, the line-guiding devices, the actuating-levers, the oscillating shaft $g$, the double-crank shaft $m^2$, mechanism for connecting it with and operating it from said oscillating shaft in semi-revolutions, a stop-arm, $r$, carried by said double-crank shaft to control its interval actions, and an arm, $q$, adapted to communicate said interval actions of the double-crank shaft to the corn-dropping device, all constructed and arranged for operation with a corn-planter, substantially as herein set forth.

In testimony whereof we have hereunto set our hands in the presence of two subscribing witnesses.

JAMES WILSON CLARK.
NORMAN A. PALMER.

Witnesses:
SAMUEL L. HAGY,
NATHAN J. KINNEY.